(12) United States Patent
Hwang

(10) Patent No.: US 9,827,862 B2
(45) Date of Patent: Nov. 28, 2017

(54) CHARGING SYSTEM AND CHARGING CONNECTOR THEREOF

(71) Applicant: Hong-Wen Hwang, Hsinchu (TW)

(72) Inventor: Hong-Wen Hwang, Hsinchu (TW)

( * ) Notice: Subject to any disclaimer, the term of this patent is extended or adjusted under 35 U.S.C. 154(b) by 122 days.

(21) Appl. No.: 14/981,792

(22) Filed: Dec. 28, 2015

(65) Prior Publication Data

US 2017/0182899 A1     Jun. 29, 2017

(51) Int. Cl.
  *H02J 7/00*    (2006.01)
  *B60L 11/18*   (2006.01)
  *H01R 13/73*   (2006.01)

(52) U.S. Cl.
  CPC ....... *B60L 11/1818* (2013.01); *B60L 11/1824* (2013.01); *H01R 13/73* (2013.01)

(58) Field of Classification Search
  CPC ........ H02J 7/025; H01F 38/14; Y02T 90/122; B60L 11/182; Y02E 60/12
  USPC ........................................................ 320/109
  See application file for complete search history.

(56) References Cited

U.S. PATENT DOCUMENTS

| 6,150,794 A * | 11/2000 | Yamada ................ B60L 11/007 320/107 |
| 8,319,474 B2 * | 11/2012 | Mitake .................... B60L 5/005 180/65.1 |
| 2012/0235639 A1 * | 9/2012 | Hamauzu ............ B60L 11/1818 320/109 |

* cited by examiner

*Primary Examiner* — Arun Williams
(74) *Attorney, Agent, or Firm* — Bruce Stone LLP; Joseph Bruce

(57) ABSTRACT

Provided is a charging system and a charging connector thereof. The charging system includes a charging stand, a positioning module mounted in front of the front surface of the charging stand for securing the tire of an electric vehicle, and a moving module mounted within and connected to the charging stand. The charging connector includes a positive charging plug and a negative charging plug located on the moving module. The charging connector is connected to the charging stand. When the electric vehicle is secured by the positioning module, the charging stand detects the type of the battery of the electric vehicle and drives the moving module to move outside the charging stand, so that the positive charging plug and the negative charging plug that are isolated from each other are connected to the chargeable positions of the electric vehicle, thereby forming a charging loop.

11 Claims, 7 Drawing Sheets

CHARGING SYSTEM AND CHARGING CONNECTOR THEREOF

BACKGROUND OF THE INVENTION

Field of the Invention

The invention is related to a system for securing and charging electric vehicle, and more particularly to a charging system with a positive charging plug and a negative charging plug being isolated from each other and the charging connector thereof.

Description of the Prior Art

With the aggravation of greenhouse effect and the energy crisis, vehicles have to change their energy supply from the petrochemical energy to the electrical energy. It is a tendency that the electric vehicles are becoming more and more popular. The energy crisis has contributed to the mushroom development of electric automobiles and electric motorcycles. As a result, the development of the charging technique for supplying electrical energy to electric vehicles has achieved significant progress.

The charging station, for example, is designed for supplying electric energy for electric vehicle, like the gas station. The charging station includes a charging apparatus for charging electric vehicles, including electric automobiles and electric motorcycles. The charging operation of the charging station is carried out by manually connecting the power-supplying elements of the charging station to the charging connector of the electric vehicle. Alternatively, the battery of the electric vehicle can be manually exchanged with a new battery. However, the aforementioned charging means requires the user to charge the electric vehicle by hand or replace the exhausted battery with a new one. This would impose some burdens to the user. More disadvantageously, if the user charges the electric vehicle by hand, the user would be exposed to danger. For example, if the power-supplying elements of the charging station are leaking electricity or if the user connects the charging station to the electric vehicle with reversal polarity, the user is prone to be electrically shocked and the electric vehicle is likely to explode.

In view of the foregoing drawbacks encountered by the conventional charging station, the invention provides a charging system and the charging connector thereof for automatically positioning and charging electric vehicle, in which the positive charging plug and the negative charging plug of the charging connector are isolated from each other.

SUMMARY OF THE INVENTION

An object of the invention is to provide a charging system and a charging connector thereof. The charging system is capable of securing the tire of an electric vehicle and automatically detecting the chargeable positions of the electric vehicle, so that the charging connector can be automatically coupled to the chargeable positions of the electric vehicle. As the position of the electric vehicle is fixed, the electric vehicle can be electrically charged. In this manner, the charging service provider can save manpower cost. Compared to the conventional charging station or battery exchange station, the invention can protect the user from being electrically shocked and prevent the electric vehicle from getting short-circuited or suffering from electrical leakage.

Another object of the invention is to provide a charging system and the charging connector thereof. The invention is featured by isolating the positive charging plug and the negative charging plug, thereby providing isolation between the positive charging plug and the negative charging plug. As is known in the prior art, it is difficult to provide an insulating space for the positive terminals and the negative terminals within the conventional cable-type charging connector. The invention is capable of suppressing this disadvantage by isolating the positive charging terminals and the negative charging terminals by providing a positive cable-type charging plug and a negative cable-type charging plug. By disallowing the positive terminals of the charging connector from contacting the negative terminals of the charging connector, the user can be protected from being electrically shocked and the electric vehicle can be protected from getting short-circuited. Thus, the convenience of the charging operation can be enhanced. Moreover, as the magnitude of the charging current flowing through the cable-type charging connector is as high as several amperes, the isolated disposition of the positive charging plug and the negative charging plug is efficient in reducing the electromagnetic interference.

Another yet object of the invention is to provide a charging system and the charging connector thereof. The charging system is featured by saving the waste of manpower, providing an easy-to-user interface, enhancing the safety level of the charging operation. The invention is capable of providing a positioning module for allowing the user to push the electric vehicle to the front of the charging stand and easily secure the electric vehicle in front of the charging stand for proceeding with the charging operation. Thus, the charging procedure can be simplified. The user may move the electric vehicle away from the charging stand after the payment procedure is finished, so as to simplify and facilitate the charging operation.

The invention is attained by the provision of a charging system for supplying electric energy to an electric vehicle. The charging system includes a charging stand, a positioning module, a moving module, and a charging connector. The positioning module is mounted in front of a front surface of the charging stand for securing at least one tire of an electric vehicle. The moving module is mounted within and connected to the charging stand for being driven by the charging stand to move upwardly, downwardly, left, right, back, and forth. The charging connector is mounted on the moving module and includes a positive charging plug and a negative charging plug connected to the charging stand for receiving electric energy therefrom. When the tire of the electric vehicle is secured by the positioning module, the charging stand detects the type of the battery of the electric vehicle. The charging stand drives the moving module to move out of the charging stand and couple the positive charging plug and the negative charging plug to a pair of chargeable positions of the electric vehicle for proceeding with the charging operation.

The charging stand further includes an electric energy converter, a sensor, and a processor. The electric energy converter is connected to the charging connector and an AC power for converting the AC power into charging energy and transmitting the charging energy to the charging connector. The sensor detects the type of the battery of the electric vehicle by way of wireless transmission. The processor is connected to the electric energy converter, the sensor, and the moving module for driving the moving module to move, thereby coupling the charging connector to the pair of chargeable positions of the electric vehicle. Thus, the positive charging plug, the negative charging plug, the pair of chargeable positions, and the battery form a charging loop to charge the electric vehicle.

The charging stand further includes a touch screen for showing the charging information of the electric vehicle, such as the voltage of the battery, the current charging the battery, and the required charging time for the battery. The touch screen may allow the user to confirm the charging operation.

The chargeable positions of the electric vehicle include a positive charging port and a negative charging port being respectively connected to the positive charging plug and the negative charging plug.

The moving module further includes a rack assembly and a sliding rod, in which the rack assembly is mounted within the charging stand, and the sliding rod is mounted on the rack assembly and connected to the charging stand. The sliding rod is driven by the charging stand to move upwardly, downwardly, left, right, back, and forth on the rack assembly.

The positioning module further includes a base and a securing member, in which the base is fixedly mounted in front of the front surface of the charging stand and includes a stopper. The stopper is configured to extend upwardly from the bottom of the base for accommodating a tire of the electric vehicle. The securing member is mounted on the base and located at a remote end away from the charging stand. When the tire of the electric vehicle moves through the securing member, the securing member secures the tire to allow the tire to be secured between the stopper and the securing member.

The front surface of the charging stand further includes a switch for allowing the moving module to move by the open and close of the switch.

Another aspect of the invention provides a charging connector mounted on a charging system. The charging connector includes a seat, a positive charging plug, and a negative charging plug. The seat is mounted on the charging system, and the positive charging plug and the negative charging plug are respectively disposed at a distal end of the seat and isolated from each other. The positive charging plug and the negative charging plug are respectively connected to a chargeable position of the electric vehicle, so that the charging system, the positive charging plug, the negative charging plug, the chargeable positions, and the battery of the electric vehicle form a charging loop to charge the electric vehicle.

The charging stand is configured to transmit a detecting current to the charging loop to detect the remaining capacity of the battery of the electric vehicle.

The seat of the charging connector further includes a detector mounted thereon for detecting the pair of chargeable positions of the electric vehicle. The detector may be implemented by an infrared detector, a laser detector, or a supersonic detector. The pair of chargeable positions of the electric vehicle respectively includes a detecting area allowable to be detected by the detector. Also, the pair of chargeable positions of the electric vehicle may be respectively formed by a funnel-like groove.

Now the foregoing and other features and advantages of the invention will be best understood through the following descriptions with reference to the accompanying drawings, in which:

DESCRIPTION OF THE PREFERRED EMBODIMENTS

Several exemplary embodiments embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

With the advent of electric vehicles, various kinds of electric vehicles, such as electric automobiles and electric motorcycles, have been produced. The development of electric vehicles has encountered some bottlenecks that need to be overcome, for example, the limited amount of electricity stored in the batteries, the slow charging rate of the battery, and the scant battery exchange facility. The invention is capable of enhancing the stability and automation level of the charging operation and adapting the configurational structure of the conventional charging connector. With the invention, the user can be protected from electric shock, and the whole circuitry can be protected from being short-circuited as a result of the wrong interconnection of the charging connector.

Figure 1:
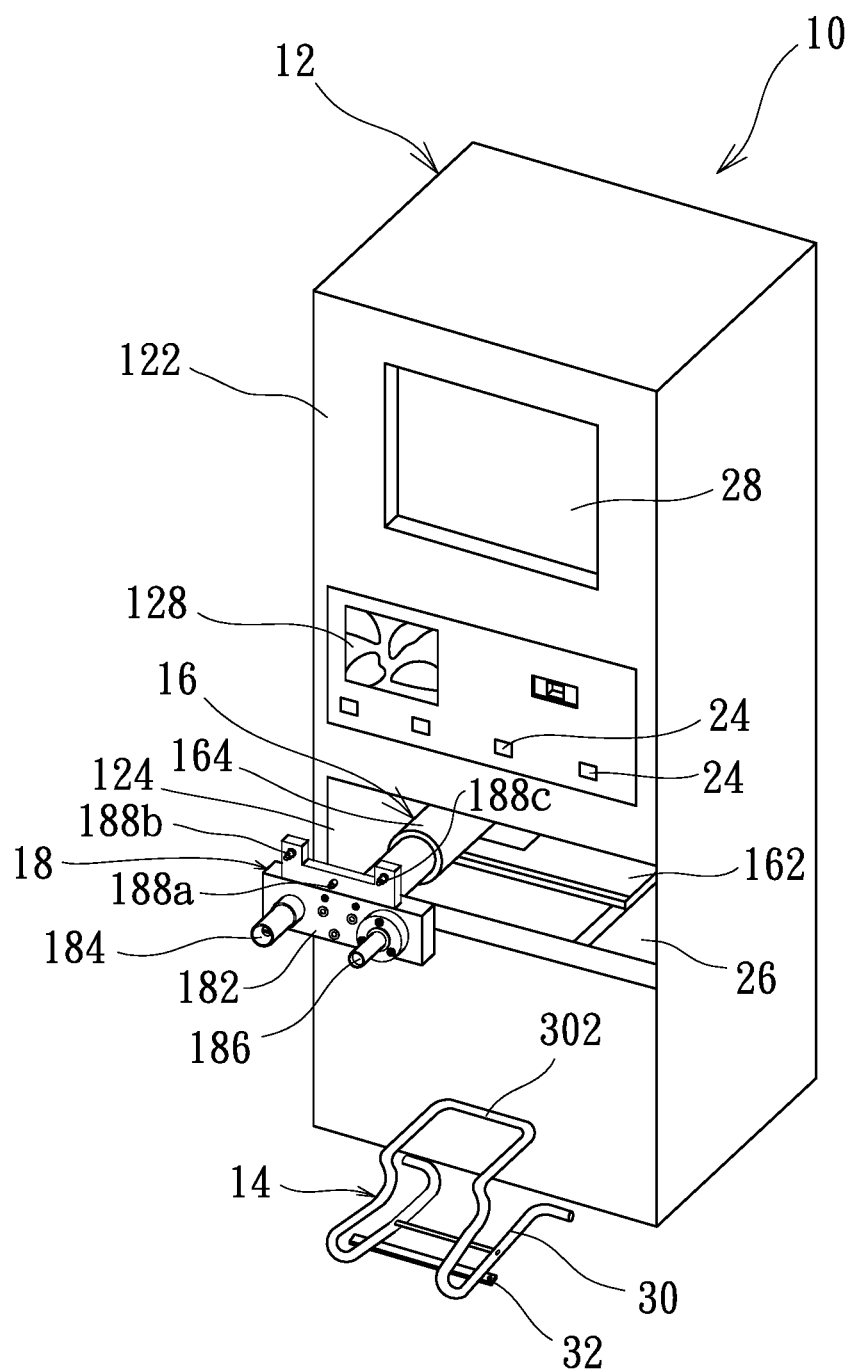
FIG. 1 shows a perspective view of the invention.
Figure 2:
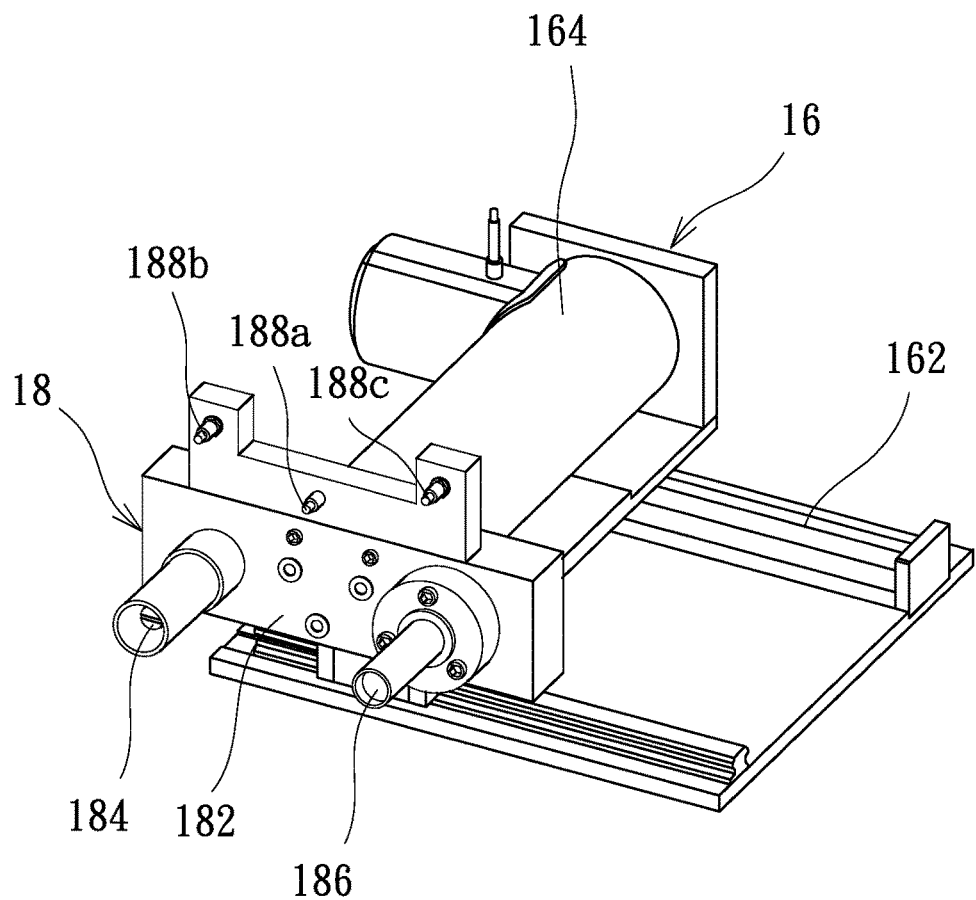
FIG. 2 is a schematic view showing the moving module and the charging connector of the invention.
Figure 3:
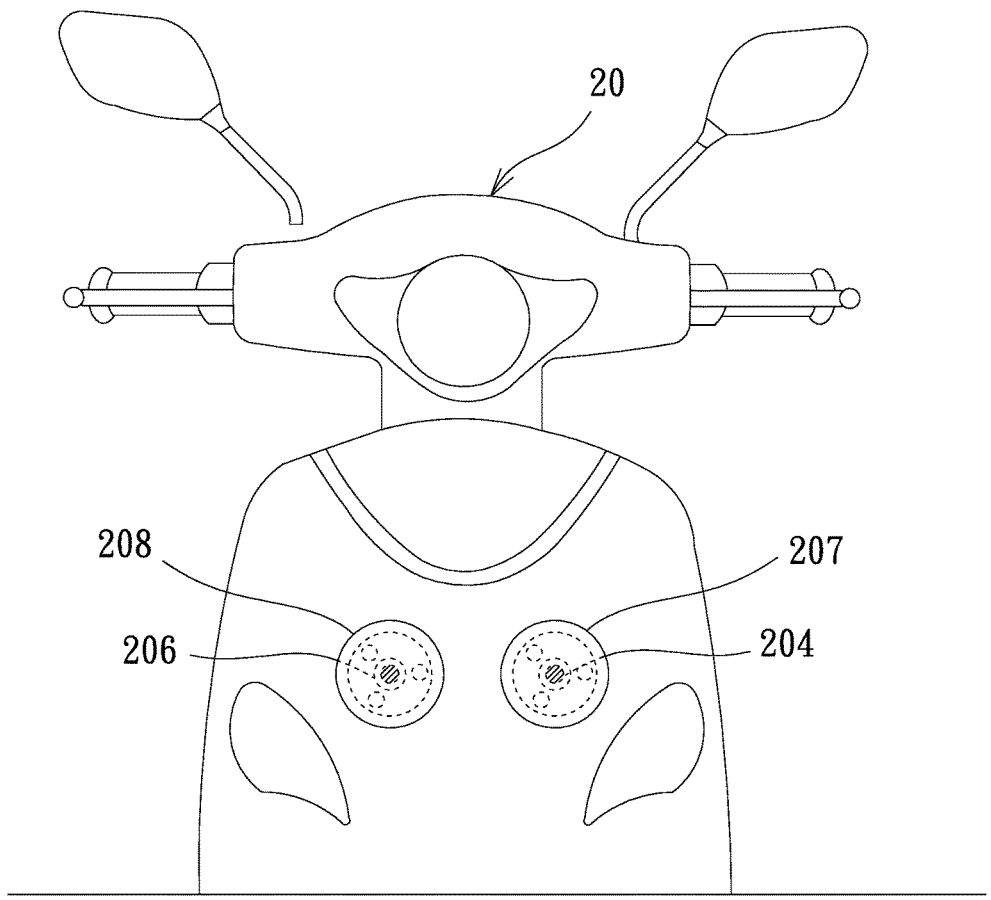
FIG. 3 is a front view of an electric motorcycle according to the invention.

Referring to FIG. 1 and FIG. 2, a charging connector 18 includes a seat 182, a positive charging plug 184, and a negative charging plug 186. The seat 182 is mounted on the moving module 16 of the charging system 10, and the positive charging plug 184 and the negative charging plug 186 are respectively mounted on a distal end of the seat 182 and isolated from each other. The positive charging plug 184 and the negative charging plug 186 are connected to the charging stand 12 of the charging system 10. In this embodiment, the positive charging plug 184 and the negative charging plug 186 are isolated from each other by at least 5 centimeters. The seat 182 further includes a detector 188a mounted between the positive charging plug 184 and the negative charging plug 186. Also, the seat 182 further includes a pair of detector 188b and 188c respectively located above the positive charging plug 184 and the negative charging plug 186. However, it is to be noted that the practical design of the charging connector is not limited to the precise form disclosed herein. For example, the charging connector 18 may include a single detector only. In this embodiment, the detectors 188a, 188b, 188c are implemented by infrared sensors. Alternatively, the detectors 188a, 188b, 188c may be implemented by laser detectors or supersonic detectors. The positive charging plug 184 and the negative charging plug 186 are respectively connected to the electric vehicle 20. Referring to FIG. 3, the positive charging plug 184 and negative charging plug 186 are respectively connected to a chargeable position 204 or 206 of the electric vehicle 20. In this embodiment, the chargeable positions 204 and 206 are respectively formed by a funnel-like groove. The chargeable positions 204 and 206 respectively include a positive charging port (not shown) and a negative charging port (not shown). The positive charging port and the negative charging port are connected to the battery (now shown) of the electric vehicle 20.

Next, the operation of the charging connector 18 will be described. The seat 182 of the charging connector 18 is carried by the moving module 16 so as to be moved to the chargeable positions 204 and 206. The detectors 188a, 188b, 188c of the charging connector 18 respectively detect the detecting area 207, 208 located on the chargeable positions 204 and 206. For example, the detector 188a can detect the traverse distance between the chargeable positions 204 and 206 and the charging connector 18, and the detectors 188b and 188c can detect the longitudinal distance between the chargeable positions 204 and 206 and the charging connector 18, thereby accurately detecting the distance between the chargeable positions 204 and 206 and the charging connector 18. In this embodiment, the detecting areas 207 and 208 are made up of a metallic material. The positive charging plug 184 and the negative charging plug 186 are respectively connected to a chargeable position 204, 206, in which the positive charging plug 184 is connected to the chargeable position 204 provided with a positive charging port, and the negative charging plug 186 is connected to the chargeable position 206 provided with a negative charging port. As a result, the charging stand 12, the positive charging plug 184, the negative charging plug 186, the chargeable position 204 and 206, and the battery (not shown) of the electric vehicle 20 form a charging loop. The charging stand 12 may transmit a detecting current to the charging loop to detect the remaining capacity of the battery, so that the electric vehicle 20 can be charged afterwards.

Figure 4:
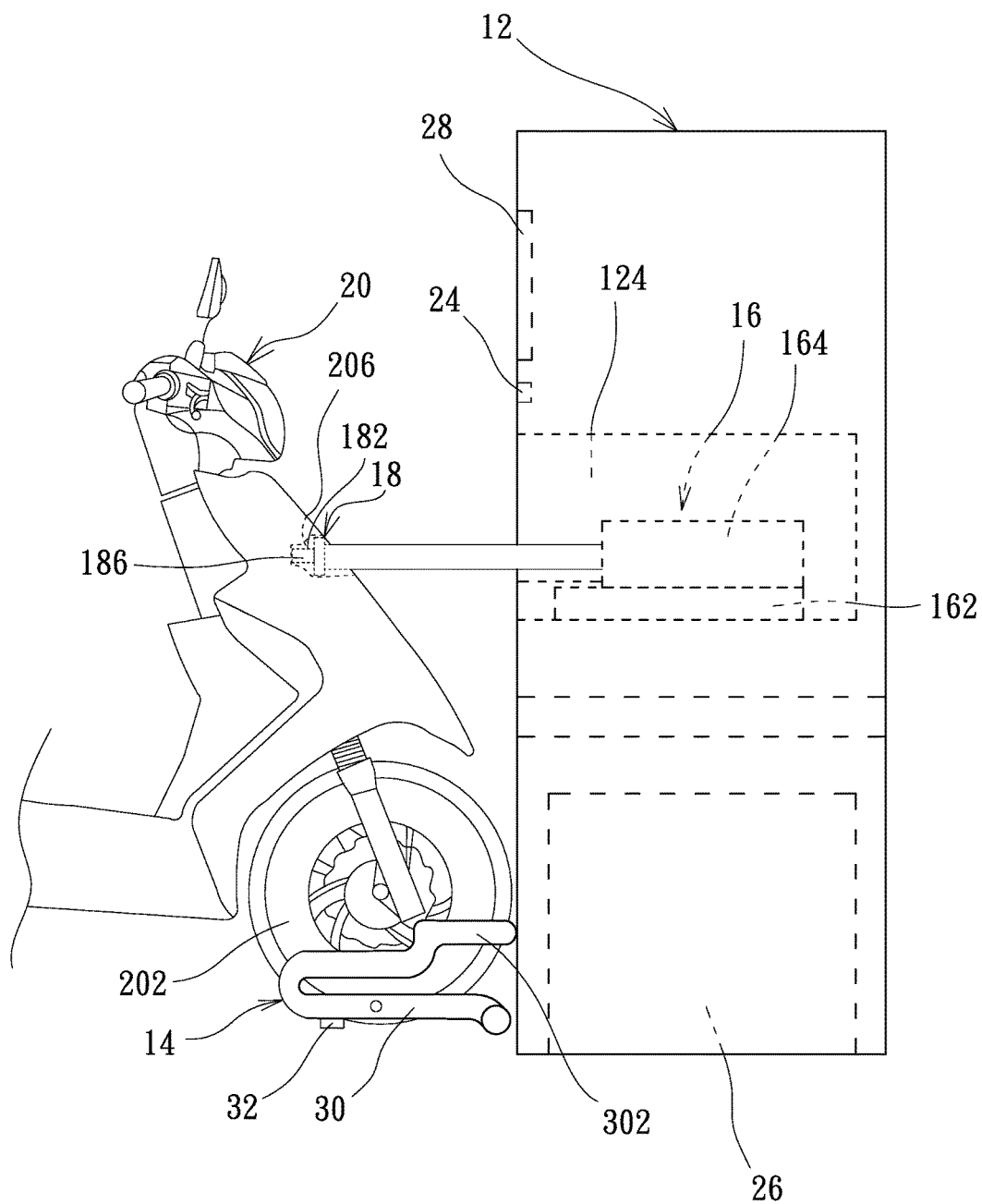
FIG. 4 is a schematic view showing the connection of the charging connector and the electric motorcycle according to the invention.
Figure 5:
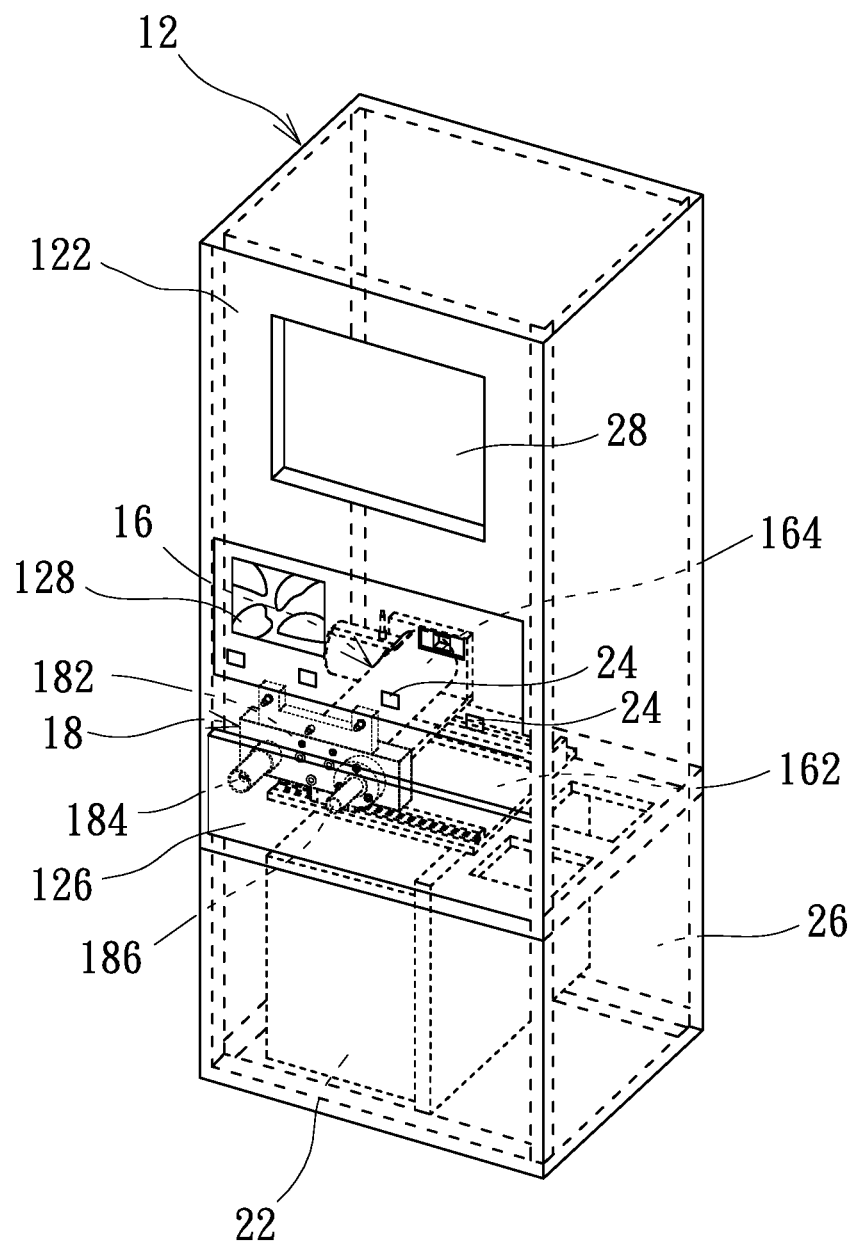
FIG. 5 is a schematic view showing the electric energy converter, the sensor, and the processor mounted within the charging stand according to the invention.
Figure 6:
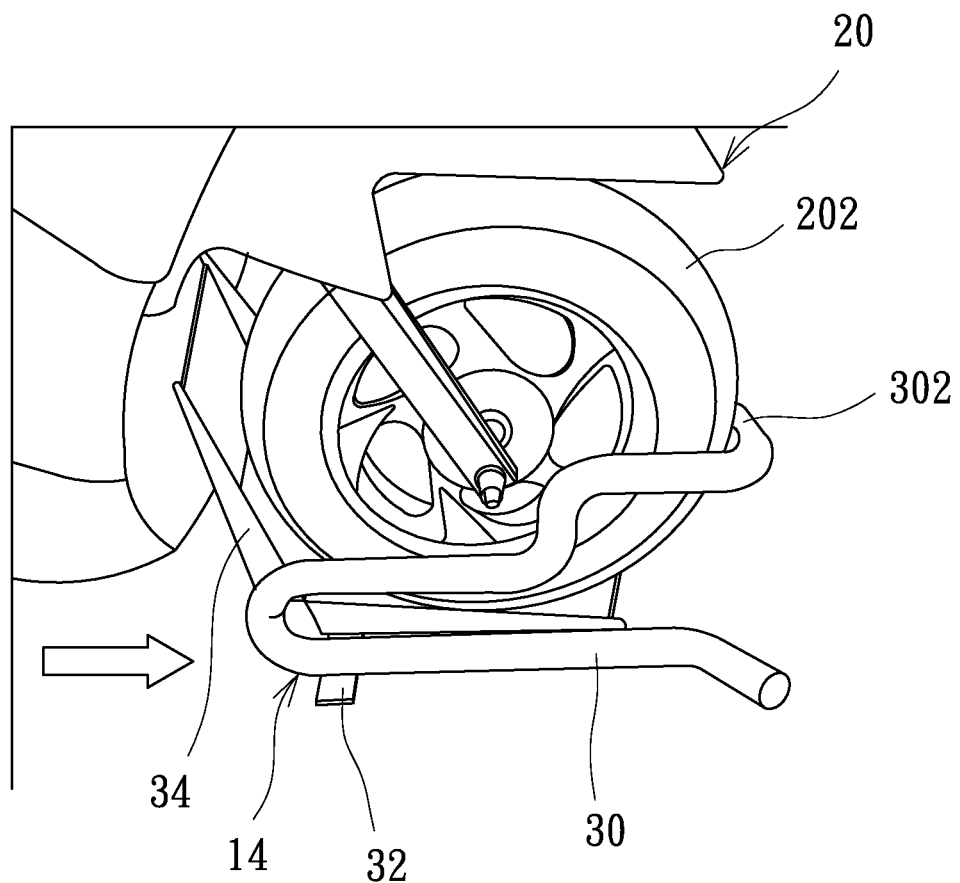
FIG. 6 is a schematic view showing the configuration constituted by using the positioning module to secure the tire according to another embodiment of the invention.

Next, the relationship between the charging connector 18 and the charging system 10 will be described. Referring to FIG. 4, FIG. 5 as well as FIG. 1, a charging system 10 includes a charging stand 12, a positioning module 14, a moving module 16, and a charging connector 18. The charging system 10 is used to supply electric energy to the electric vehicle 20, which can be a two-wheeler or an electric vehicle with the number of wheels being more than two. In this embodiment, an electric motorcycle is taken as example of the electric vehicle 20. The charging stand 12 further includes an electric energy converter 22, a sensor 24, and a processor 26. The electric energy converter 22 is connected to the charging connector 18 and an AC power (now shown). In this embodiment, the AC power can be a commercially available AC power. The processor 26 is connected to the electric energy converter 22, the sensor 24, and the moving module 16. The front surface 122 of the charging stand 12 includes an opening 124 and a switch 126 located outside the opening 124. The switch 126 can be opened or closed so as to divulge or conceal the opening 124. The charging stand 12 further includes a touch screen 28 mounted above the opening 124. The positioning module 14 is mounted in front of the front surface 122 of the charging stand 12 for securing at least one tire of the electric vehicle 20. In this embodiment, the tire to be secured by the positioning module 14 is the front wheel 202. The moving module 16 is mounted within the charging stand 12 and connected to the charging stand 12. The moving module 16 is driven by the charging stand 12 to move upwardly, downwardly, left, right, back, and forth. The charging connector 18 is mounted on the moving module 16 and connected to the charging stand 12 for receiving electric energy from the charging stand 12.

Referring to FIG. 2, the operation of the moving module 16 and the charging connector 18 will be described in detail. The moving module 16 includes a rack assembly 162 and a sliding rod 164. The rack assembly 162 is mounted within the charging stand 12, and the sliding rod 164 is mounted on the rack assembly 162 and connected to the charging stand 12. The charging connector 18 includes a seat 182, a positive charging plug 184, and a negative charging plug 186. The seat 182 is mounted on the sliding rod 164 of the moving module 16 of the charging system 10. The seat 182 further includes a detector 188a. The positive charging plug 184 and the negative charging plug 186 are respectively mounted on a distal end of the seat 182, and the detector 188a is mounted between the positive charging plug 184 and the negative charging plug 186. Also, a pair of detectors 188b and 188c are respectively mounted above the positive charging plug 184 and the negative charging plug 186. In this embodiment, the spacing between the positive charging plug 184 and the negative charging plug 186 is at least 5 centimeters. The detectors 188a, 188b, and 188c may be implemented by infrared sensors.

Next, the structure of the positioning module 14 of FIG. 1 will be described in detail. Referring to FIG. 1 and FIG. 2, the positioning module 14 further includes a base 30 and a securing member, in which the securing member is implemented with a lever 32 in this embodiment. The base 30 is fixedly mounted in front of the front surface 122 of the charging stand 12, and the base 30 further includes a stopper 302 extending upwardly from the bottom of the base 30. The lever 32 is mounted on the base 30 and located on a bottom side of the base 30 away from the charging stand 12. The securing member, for example, the lever 32, is used to secure the tire of the electric vehicle 20, so that the tire is secured between the securing member and the stopper 302. It is to be noted that the structure and the shape of the securing member can be modified depending on the design requirements. For example, the securing member can be implemented by a lever 32 and a rotating frame 34.

Next, the automatic charging process of the invention will be described in detail. Referring to FIGS. 1-5, the user moves the electric vehicle 20 to the vicinity of the charging system 10 and pushes the electric vehicle 20 toward the opening end of the base 30 of the positioning module 14. The tire 202 advances along the opening end of the base 30 toward the stopper 302 located in the inner side of the base 30, until the front end of the tire 202 is accommodated in the stopper 302. The lever 32 of the positioning module 14 then blocks the rear end of the tire 302, so that the tire 202 is secured between the stopper 302 and the lever 32 of the positioning module 14. Therefore, the electric vehicle 20 is fixed at a specific position. After the electric vehicle 20 is fixed, the sensor 24 of the charging stand 12 senses the type of the battery of the electric vehicle 20 by way of wireless transmission. In this embodiment, the wireless transmission may be accomplished by the radio frequency (RF) transmission. Referring to FIG. 3, after the type of the battery of the electric vehicle 20 is detected, the processor 26 manipulates the moving module 16 to move upwardly, downwardly, left, right, back, and forth so as to move through the switch 126. The detectors 188a, 188b, 188c detects the accurate position of the detecting areas 207 and 208 located on the chargeable positions 204 and 206 of the electric vehicle 20, in which the detector 188a detects the traverse distance between the detectors and the detecting areas, and the detectors 188b and 188c detect the longitudinal distance between the detectors and the detecting areas. In this embodiment, the detecting areas 207 and 208 are made up of a metallic material. When the positions of the chargeable positions 204 and 206 are detected, the moving module 16 carries the charging connectors 18 to move and couple with the chargeable positions 204 and 206. In this embodiment, the chargeable positions 204 and 206 are respectively formed by a funnel-like groove. The chargeable position 204 includes a positive charging port (not shown) and the chargeable position 206 includes a negative charging port (now shown). The positive charging port and the negative charging port are connected to the battery (not shown) of the electric vehicle 20. Next, the chargeable position 204 provided with the positive charging port is connected to the positive charging plug 184, and the chargeable position 206 provided with the negative charging port is connected to the negative charging plug 186. Thus, the positive charging plug 184, the negative charging plug 186, the chargeable positions 204 and 206, and the battery of the electric vehicle 20 form a charging loop. The charging stand 12 may transmit a detecting current to the charging loop to detect the remaining capacity of the battery. The information about the remaining capacity of the battery and the type of the battery is shown in the touch screen 28. In addition, the information about the voltage of the battery, the current charging the battery, and the required charging time for the battery, is shown on the touch screen 28 for the user to confirm. After the user confirms this information, the charging stand 12 of the charging system 10 allows the electric energy converter 22 to convert AC power into charging energy, thereby charging the electric vehicle 20 through the charging loop. After the charging operation is completed, the user may proceed to the payment procedure to pay the charging fee. The user may pay the charging fee by a smartcard. However, the payment method of the charging fee is adaptable. The front surface of the charging stand 12 includes a sensor 128 for collecting the charging fee by allowing the user to pass the smartcard over the sensor 128. After the payment procedure is completed, the user may move the electric vehicle 20 out of the charging system 10.

As stated above, the chargeable positions 204 and 206 are respectively formed by a funnel-like groove. Even if the aim for the positive charging plug 184 and the negative charging plug 186 to connect to the chargeable positions 204 and 206 is slightly deviated from the accurate position of the chargeable positions 204 and 206, the positive charging plug 184 and the negative charging plug 186 still can slidably enter the grooves and reach the deepest point of the chargeable positions 204 and 206, thereby accomplishing the coupling of the positive charging plug 184 and the negative charging plug 186 with the chargeable positions 204 and 206. Besides, the automatic charging process will be interrupted when the following conditions are met: (1) when it reaches the required charging time, the automatic charging process will be halted; (2) when the charging voltage reaches the predetermined voltage level, the automatic charging process will be halted; (3) when the detecting current flowing through the battery of the electric vehicle 20 indicates that the battery is problematic, the automatic charging process will not be activated; (4) when the charging loop is short-circuited, the automatic charging process will be halted; and (5) when the user utilizes the charging system 10 improperly, for example, by crashing the charging connector 18 or removing the electric vehicle 20 from the charging system 10 during the charging process, the automatic charging process will be halted. These measures are set to protect the user, the charging system 10, and the electric vehicle 20.

Figure 7:
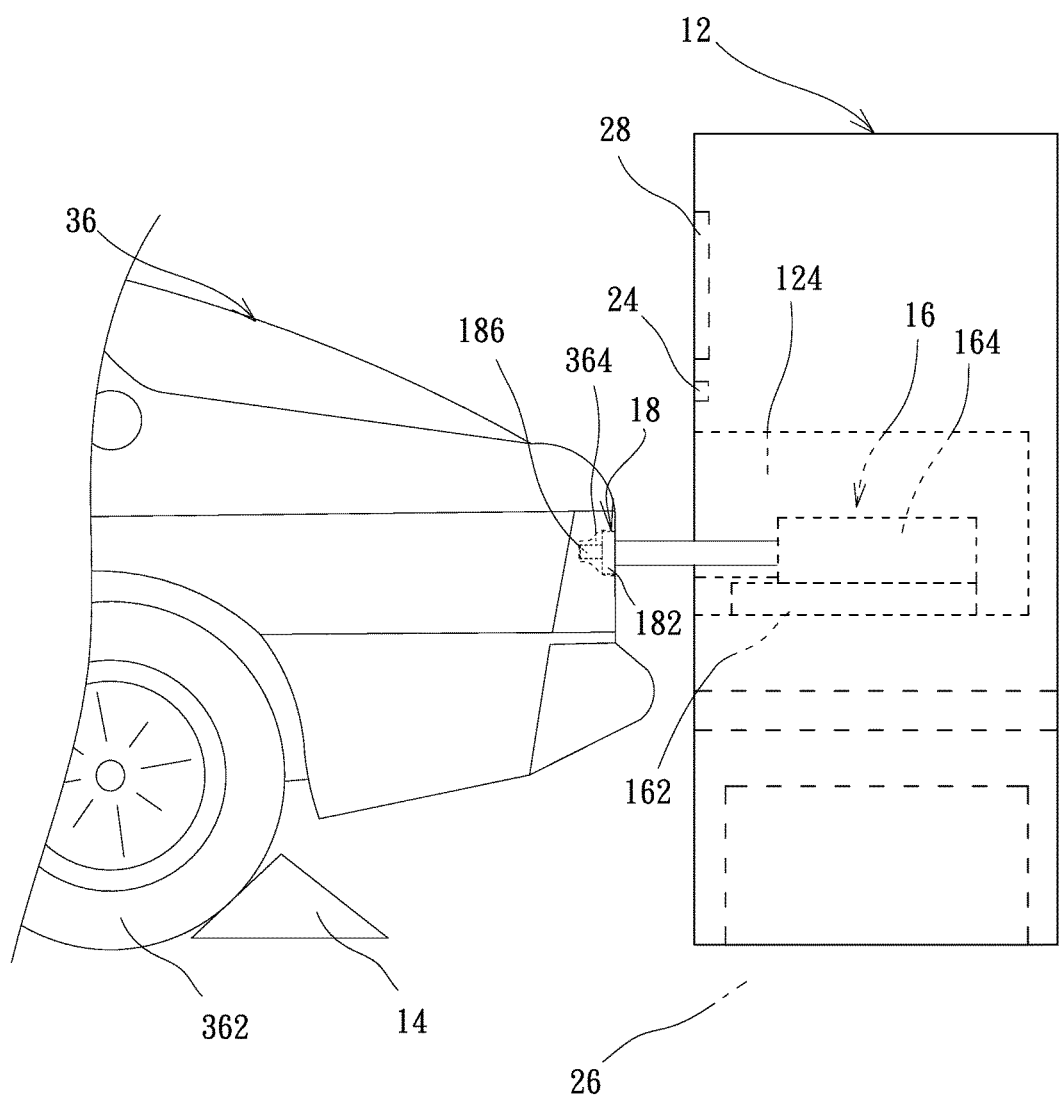
FIG. 7 is a schematic view showing the connection of the charging connector and the electric automobile according to the invention.

Moreover, while the electric motorcycle is taken as an example of electric vehicle, the invention can be applied to electric automobiles as well. Referring to FIG. 1 and FIG. 7, when the user can drive an electric automobile 36 to the charging stand 12, the user can drive the electric automobile 36 forward to the charging stand 12 or drive the electric automobile 36 backward to the charging stand, depending on the positions of the chargeable positions of the electric automobile 36. Here, the way of driving electric automobile 36 backward is taken as an example to illustrate the way of how the electric automobile 36 enters the positioning module 14. When the rear wheel 362 of the electric automobile 36 touches the positioning module 14 on the ground, the design of the positioning module 14 is different with the design of the positioning module 14 illustrated in the foregoing embodiments. In this embodiment, the positioning module 14 is devised as a baffle. As shown in FIG. 7, the baffle may be a triangular device. After the rear wheel 362 of the electric automobile 36 is secured by the positioning module 14, the rear wheel 362 can no longer move the electric automobile 36 backward, thereby allowing the rear wheel 362 to be secured in front of the charging stand 12. In the meantime, the charging stand 12 detects the type of the battery of the electric automobile 36 and drives the moving module 16 to move outside the charging stand 12, thereby moving the charging connector 18 on the moving module 16 outside the charging stand 12. Afterwards, the detectors 188a, 188b, 188c detect the chargeable positions 364 of the electric automobile 36, thereby allowing the positive charging plug 184 and the negative charging plug 186 to be respectively coupled to the positive charging port (not shown) and the negative charging port (not shown) of the chargeable position 364. The coupling of the charging connector and the detection of the chargeable positions for the electric automobile 36 is similar to those for electric motorcycles. The main feature of the invention is attained by isolating the positive charging plug 184 from the negative charging plug 186. After the positive charging plug 184 and the negative charging plug 186 are coupled to the electric automobile 36, a charging loop is formed to start the charging process. The charging stand 12 can be installed in a parking lot or in a parking garage, or in a parking space. After the user has parked the electric automobile 36, the user may charge the electric automobile 36 upon leaving, thereby eliminating the waste of time finding a charging station. The charging system of the invention offers the advantages of full automation, cost-effectiveness, optimized safety, and great convenience.

The electric two-wheelers include electric motorcycles and electric bikes. The electric four-wheelers include electric automobiles and electric golf carts. The invention can be applied to electric two-wheelers and electric four-wheelers, and electric vehicles with the number of wheels being more than four. Hence, the type of the applicable electric vehicle for the invention is not limited to two-wheelers or four-wheelers, and the invention is not limited to position a single tire of the electric vehicle. The spirit of the invention is focused on the automatic positioning of the electric vehicles and automatic charging of the electric vehicles. Therefore, the invention can protect the user from being damaged or prevent the malfunction of the electric vehicle as a result of the inadvertent operation of the user. More advantageously, the user does not need to manually charge the electric vehicle in rainy days, thereby reducing the risk of being electrically shocked. Furthermore, the isolated disposition of the positive charging plug and the negative charging plug serves as a foolproof design for protecting the user and facilitating the connection between the charging system and the electric vehicle. Also, the isolated disposition of the positive charging plug and the negative charging plug can reduce the electromagnetic interference and enhance the insulation of the internal components of the charging connector. Thus, the invention can increase the convenience for the user, promote the safety level for the charging process, and reduce manufacturing cost.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A charging system for securing and charging an electric vehicle, comprising:
    a charging stand supplying electric energy;
    a positioning module mounted in front of a front surface of the charging stand for securing at least one tire of the electric vehicle;
    a moving module mounted within and connected to the charging stand for being driven by the charging stand to move upwardly, downwardly, left, right, back, and forth; and
    a charging connector having a positive charging plug and a negative charging plug and mounted on the moving module, the positive charging plug and the negative charging plug respectively connected to the charging stand for receiving electric energy therefrom;
    wherein when the at least one tire of the electric vehicle is secured by the positioning module, the charging stand detects a type of a battery of the electric vehicle and drives the moving module to move outside the charging stand, thereby respectively coupling the positive charging plug and the negative charging plug to a pair of chargeable positions of the electric vehicle to charge the electric vehicle.

2. The charging system according to claim 1, wherein the charging stand further includes:
    an electric energy converter connected to the charging connector and an AC power for converting the AC power into charging energy and transferring the charging energy to the charging connector;
    a sensor for detecting the type of the battery of the electric vehicle by a wireless transmission; and
    a processor connected to the electric energy converter, the sensor, and the moving module for driving the moving module to move in response to a detected result of the sensor to couple the charging connector on the moving module to the pair of chargeable positions, thereby allowing the positive charging plug, the negative charging plug, the pair of chargeable positions, and the battery of the electric vehicle to form a charging loop.

3. The charging system according to claim 1, wherein the electric vehicle is a two-wheeler or a vehicle with the number of wheels being more than two.

4. The charging system according to claim 1, wherein the pair of chargeable positions are respectively formed by a funnel-shaped groove.

5. The charging system according to claim 4, wherein the pair of chargeable positions respectively include a positive charging port and a negative charging port being respectively coupled to the positive charging plug and the negative charging plug.

6. The charging system according to claim 1, wherein the positioning module further includes:
    a base located in front of the front surface of the charging stand and having a stopper extending upwardly from a bottom of the base for accommodating the at least one tire of the electric vehicle; and
    a securing member mounted on the base and located on a remote end of the base away from the charging stand for securing the tire of the electric vehicle when the tire of the electric vehicle moves through the securing member, thereby securing the tire of the electric vehicle between the stopper and the securing member.

7. A charging connector mounted on a charging system, comprising:
    a seat mounted on the charging system; and
    a positive charging plug and a negative charging plug isolated from each other and respectively disposed at a distal end of the seat and connected to the charging system, so as to be coupled to a pair of chargeable positions of an electric vehicle, thereby allowing the charging system, the positive charging plug, the negative charging plug, the pair of chargeable positions, and a battery of the electric vehicle to form a charging loop to charge the electric vehicle, and the charging system includes:
        a moving module mounted on the seat for carrying the seat to move to the pair of chargeable positions, thereby allowing the positive charging plug and the negative charging plug to be coupled to the pair of chargeable positions; and
        a charging stand connected to the positive charging plug and the negative charging plug to form a charging loop with the positive charging plug, the negative charging plug, the pair of chargeable positions, and the battery of the electric vehicle for charging the battery of the electric vehicle.

8. The charging connector according to claim 7 wherein the seat further includes a detector mounted thereon for detecting the pair of chargeable positions of the electric vehicle.

9. The charging connector according to claim 7, wherein a spacing between the positive charging plug and the negative charging plug is at least 5 centimeters.

10. The charging connector according to claim 7, wherein the pair of chargeable positions are respectively formed by a funnel-like groove.

11. The charging connector according to claim 10, wherein the pair of chargeable positions respectively include a positive charging port and a negative port, the positive charging port is coupled to the positive charging plug and the negative charging port is coupled to the negative charging plug.

* * * * *